Aug. 12, 1952 V. HARMS 2,606,820
APPARATUS FOR PRECIPITATION OF SOLIDS
FROM SOLUTIONS AND THE LIKE
Filed July 3, 1948 4 Sheets-Sheet 3

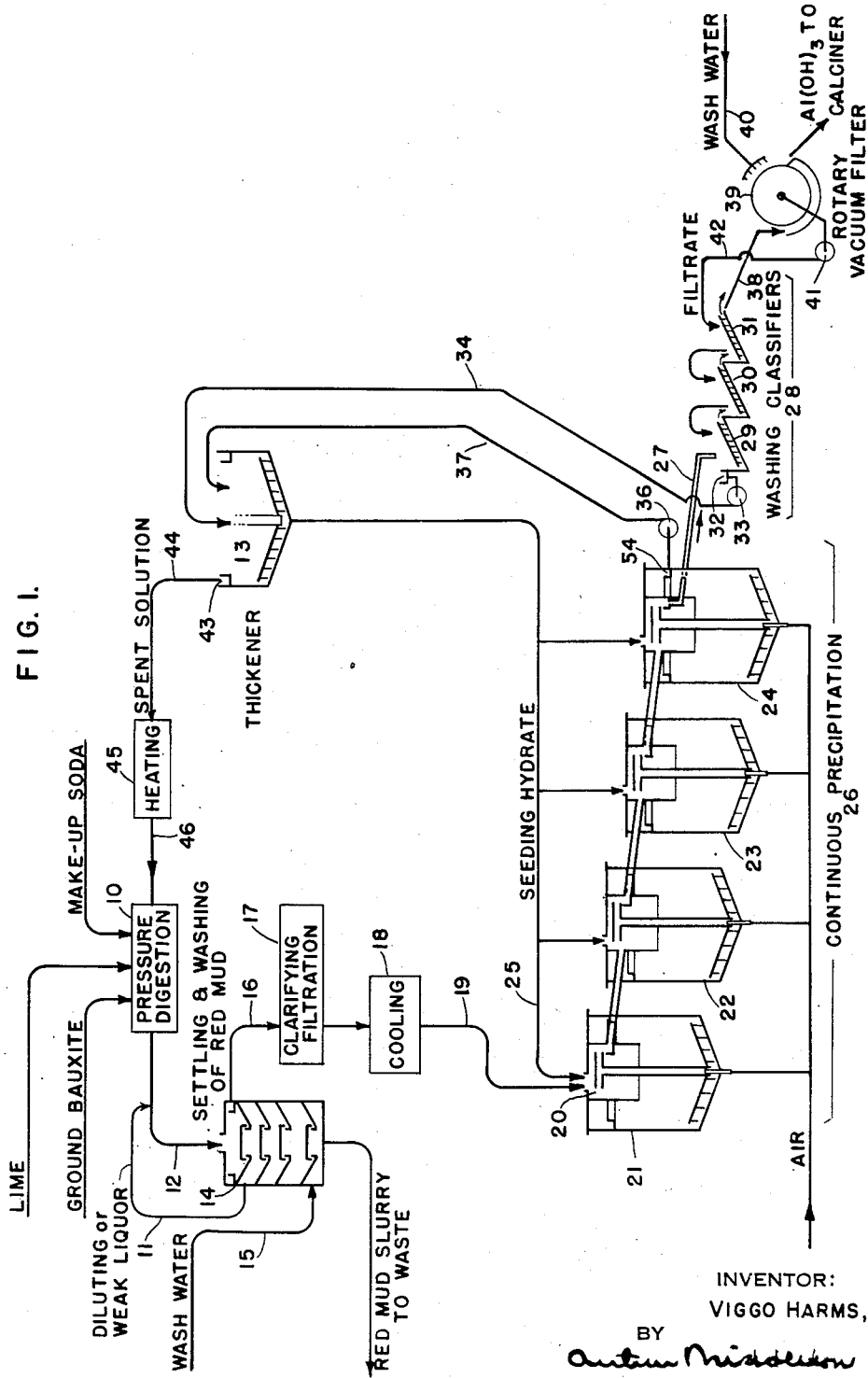

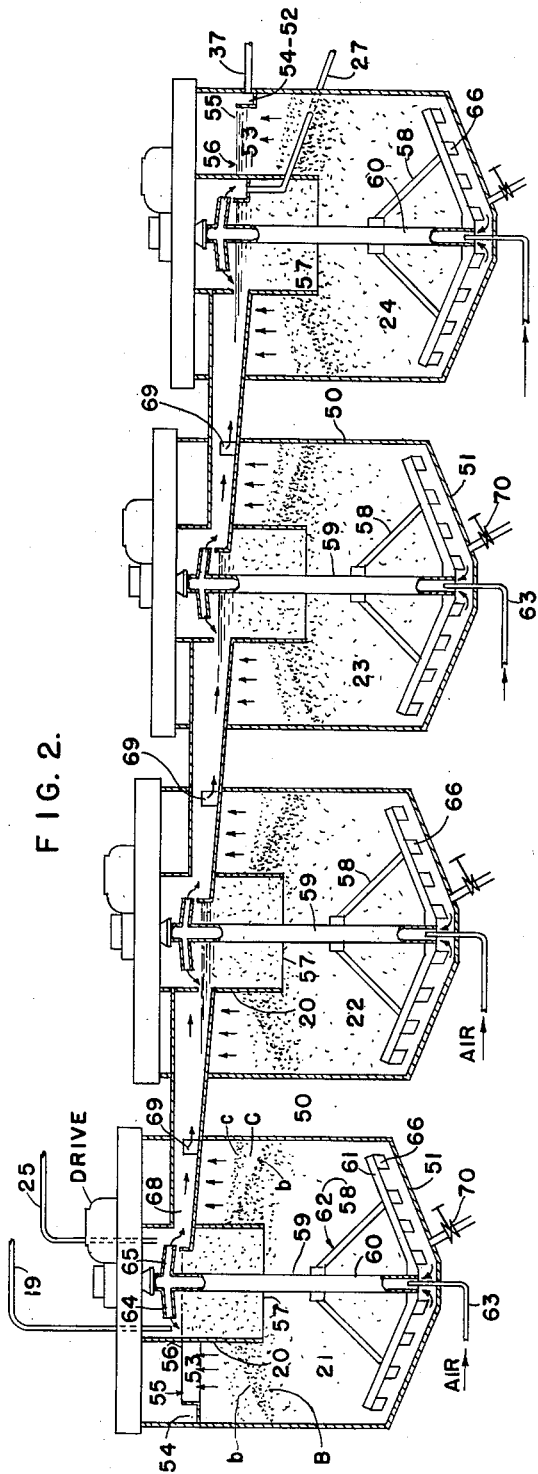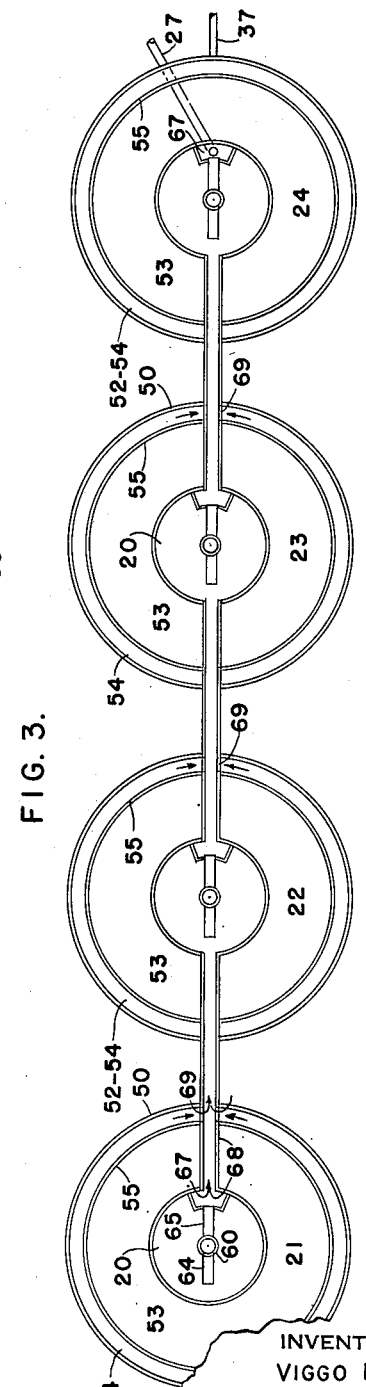

INVENTOR:
VIGGO HARMS,
BY
ATTORNEY

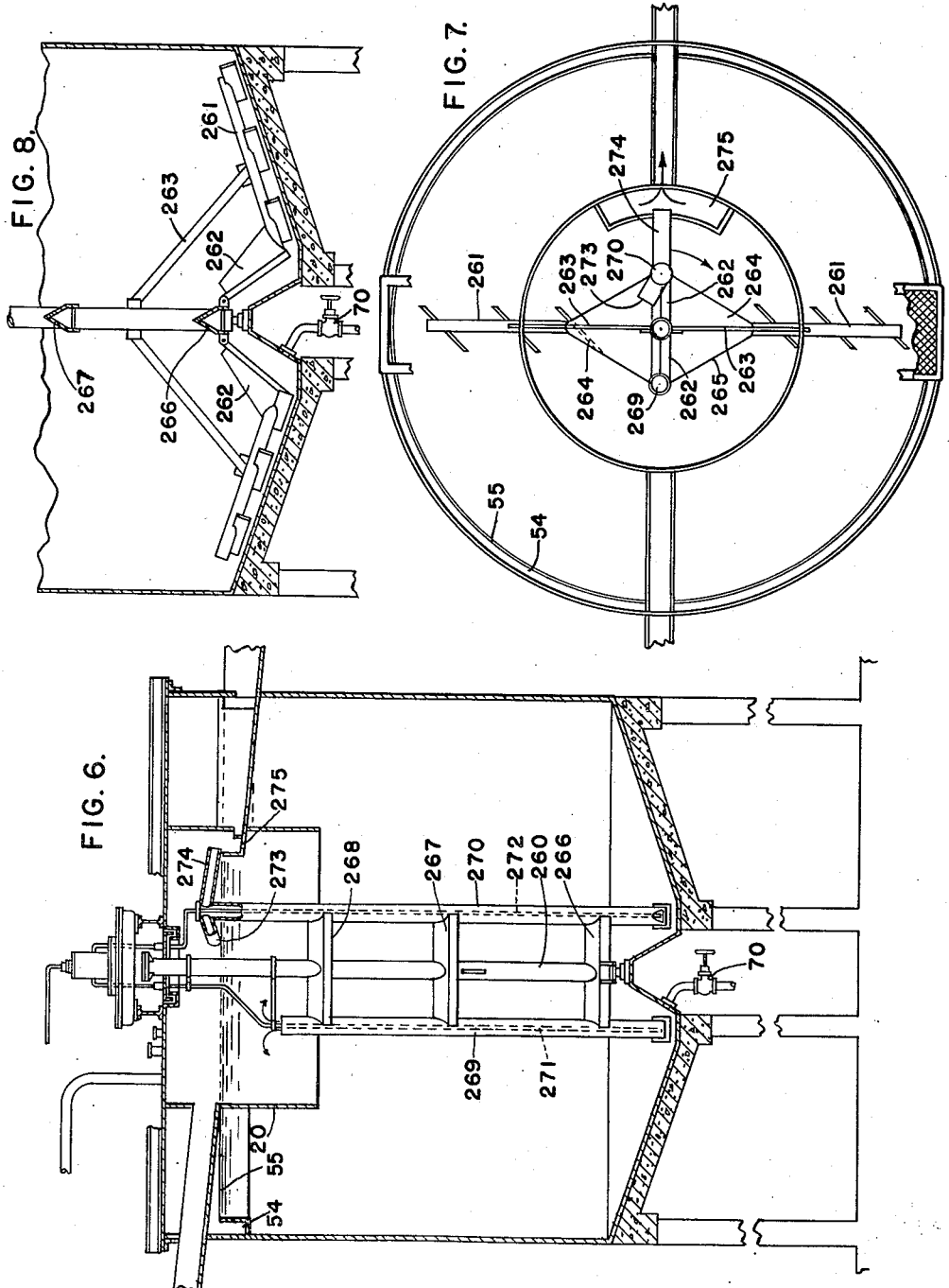

Patented Aug. 12, 1952

2,606,820

UNITED STATES PATENT OFFICE 2,606,820

APPARATUS FOR PRECIPITATION OF SOLIDS FROM SOLUTIONS AND THE LIKE

Viggo Harms, New York, N. Y., assignor to The Dorr Company, Stamford, Conn., a corporation of Delaware Application July 3, 1948, Serial No. 36,834
In Great Britain September 25, 1947

2 Claims. (Cl. 23—273)

This invention relates to a method and apparatus for treating a solution from which crystals are potentially precipitable and as such is suitable for use, for instance, in the precipitation of alumina hydrate from a solution of sodium aluminate. Indeed, this invention is usable in connection with precipitating and controlling crystal growth of precipitates as they pass into solid phase from their mother liquor, so this invention may also be used in the making of magnesia hydrate from sea-water, and other similar processes.

More particularly, this invention may be said to relate to the control of crystal growth and size at the place and time when such crystals are precipitated from a pregnant solution or as a result of chemical reaction between liquids. Specifically, the invention relates to the precipitation of alumina hydrate from a sodium aluminate solution which upon cooling and possibly dilution, tends to decompose to yield the alumina hydrate in solid-phase precipitated crystal form. An object of this invention is to control the precipitation to yield a well-developed granular crystalline end-product.

This invention consists in continually feeding a solution having crystals potentially crystallizable therefrom into a container or vessel joining there a body of such solution undergoing progressive precipitation of crystals from their mother liquor whereby there is yielded a pulp including the crystals. Larger and more developed crystals, or grains thereof, settle to the bottom of the vessel or container in the form of sediment which comprises a group or mass of crystals that have been segregated from the smaller or less developed crystals moving about the body of solution in the container, as a result of sedimentation that takes place in the body of liquid or pulp in the container. These segregated or settled larger crystals are moved or swept along the bottom of the tank by moving raking blades that move so slowly that the sediment is not roiled up. The blades convey the settled solids to the intake section in the bottom of a draft-tube element upstanding in the container. These segregated settled crystallized solids in suspension so fed to the draft-tube are sucked or lifted in that tube (while maintained so segregated) due to being impelled upwardly as a result of an air-lift arrangement or possibly an impeller, whereupon these lifted segregates are discharged from the draft-tube in a way to meet two requirements. One requirement is that a fraction of these lifted segregates shall be discharged with relation to the body of solution within the container from which they were lifted so that these segregates will move generally downwardly but perhaps through circuitous paths through the body of solution from which crystals are being crystallized. The idea is that these downwardly moving segregates act as nuclei upon which newly precipitating material tends to cling and grow into a larger crystal than to form a separate tiny crystal. Important is this moving of the segregated larger crystals from the bottom of the container wherein they are moved from the place of the settling to the upper section of the body or solution undergoing precipitating crystallization. And important too, is the fact that the moving downwardly of these segregates and indeed any agitative forces that may be present in the container, must have their velocities congruous with or permissive of, the action of sedimentation to yield the segregated settled crystals that are lifted up for reuse. The second requirement as to the discharge of the segregates from the upper or discharge end of the draft-tube is that one fraction of the discharging segregates shall be passed to a subsequent container in a series or sequence of such crystal precipitating container or tanks. A function of the draft-tube for lifting the segregates is that it maintains the segregates during their lifting separate and apart from the pulp in container.

The invention also consists in apparatus comprising a series of cylindrical precipitation tanks, containers, or vessels each preferably but not necessarily having a conical bottom, a skirt or baffle depending into the central vertical zone of the liquid in the tank and providing an open bottom feed receiving well of less diameter than that of the cylindrical tank to which it corresponds, means for continuously delivering liquid for treatment through said skirt or well into the tank, raking means arranged so that in conjunction with the skirt a suitably quiescent settling zone is furnished around said central zone, means for removing a portion of settled coarser precipitates and delivering a predetermined quantity or adjustable portion or proportion thereof to the skirt for recirculation in and through the tank, and discharging another predetermined quantity or adjustable portion or proportion thereof to a region outside of the tank, generally but not necessarily always with overflow clarified liquid or mother liquor from the tank as to another similarly equipped tank of the series for repetitive operations or in the instance of the last tank to a region outside of the same for another mode of employment or disposition thereof.

In carrying the invention into effect according to one mode described by way of example as applied to the precipitation of aluminum hydrate from a clarified solution of sodium aluminate, a series of precipitation tanks similar to those known as Dorr agitators, are provided, each of which is furnished with movable rake arms mounted on a central vertical hollow air-lift shaft or tube. The bottom of the tank is of inverted conical shape and the raking blades are arranged to sweep, or scrape the conical surface to direct or feed settled precipitates or sediment towards the lowest portion of the cone. The central tube and rake arms are slowly revolved by suitable drive means located at the top of the tank, and the upper end of the air-lift tube has a plurality of radial nozzles or conduits providing tube discharge members by or through which pulp ascending within and delivered from the tube is distributed outwardly as the tube revolves.

The cylindrical baffle or skirt providing the feedwell is arranged in the upper portion of the tank so that it extends downwardly into the liquid to a substantial extent. It is to be noted that each tank is provided with a supernatant liquid effluent outflow means leading from the annular zone about the skirt and this outflow means includes a member providing an overflow weir edge that determines the normal operative liquid-level of the body of liquid within the tank, or as otherwise expressed, the normal operative level of the liquid existing in the annular region about the feedwell. The sodium aluminate solution to be fed to the tank enters the skirt or feedwell through a suitable pipe line or other suitable feed supply means. In certain forms of apparatus for realizing or performing the invention the central vertical hollow shaft or tube above referred to provides or serves as an arm-carrying element for outwardly-extending arms with depending solids-engaging means or impelling members serving as raking elements functionable over and along the floor of the tank. In such form of construction, this hollow shaft or central tube is used to serve as a draft tube and an air lift which is employed for lifting settled or segregated solids or crystals from the lower interior portion of the tank and for delivering a quantity thereof into the feedwell and for delivering another quantity or portion of the lifted solids for ultimate disposition to a region outside of the tank, as for example, into the feedwell of a succeeding tank or in the instance of the last tank or sump other tank of the series to a region outside of that tank for a particular mode of employment thereof. The draft tube, instead of being equipped with air effecting lifting operation of settled solids thereby may also be constructed and equipped with a mechanical impeller disposed in conjunction therewith for creating a suction and lifting effect sufficient for realizing a sucking-in of the settled solids a lifting thereof and for the effective delivery thereof from the upper end of the tube. It is feasible, however, as will hereinafter appear to employ an arm-carrying structure of a cage or frame construction in which draft tubes are embodied therein or provided thereupon as in positions laterally offset to a vertically-extending center-line about which the arm-carrying structure turns. The air lifts, or pumping devices as they may be referred to, and which employ the draft tubes as described may be viewed as draft tube providing means which when laterally offset from the vertical axial line about which they turn function to mechanically rake or feed settled solids along the bottom of the tank to the intake of the draft tube for effecting a constant supply thereof for uplifting in that tube. A quantity or portion of such lifted solids is delivered back into the feedwell whereby it undergoes further treatment in a tank of such decomposing solution for repetitive treatment therein, while another quantity or portion of the thus lifted segregated solids or crystals is passed into a succeeding tank for further treatment therein.

In the tanks as illustrated, there is shown within the skirt and slightly above the liquid level thereof a short segmental or arcuate launder in the form of a short open top trough which is provided for receiving a fraction or quantity of lifted solids thereinto from a discharge element or member provided at or leading from the upper end of the pump or draft tube and from this short launder according to the construction illustrated there is provided a conducting tube or outwardly extending discharge trough section disposed in the one instance whereby that portion of the liquid solids delivered from the pumping means is passed outwardly within and from the tank and has a locality at which the outflowing content, to wit: pulp therein, merges with the supernatant effluent en route from the tank. However, it will be noted that the conducting tube or discharge trough section leading from this short arcuate launder can be constructed and disposed for passing the outwardly conveyed quantity of pulp received into the arcuate launder to a region outside of the tank and independent of the supernatant liquid passing from the same tank. This arcuate launder or open top receiving trough section which is mounted or provided within the skirt or feedwell may be of an extent whereby it is adjustable to regulate the quantity of pulp which may be delivered thereinto.

As previously indicated a supernatant outflow means is provided within the tank and has a member providing an overflow weir element for determining the normal operative level of the supernatant liquid within the tank. This outflow means in the construction shown embodies an overflow launder arranged at the peripheral portion of the tank at the desired predetermined maximum level for the liquid within the tank. This peripheral launder discharges into a channel or chute communicating with the arcuate launder within the skirt and discharges into the skirt of the next tank of the series, to wit, in that instance where the pulp discharge is to be taken care of in the succeeding tank.

The arcuate launder is so placed with reference to the centrally disposed rotating draft tube referred to that the radial nozzles or distributing launders or elements associated with the upper end of the draft tube periodically discharge during their revolution into the arcuate launder so that of the coarser particles raised by the air lift a predetermined percentage is re-delivered into the tank within the confines of the skirt or feedwell for recirculation whilst another percentage, as may be determined or according to adjustment of the arcuate launder, is discharged into said launder and through said chute into the next succeeding tank.

The arrangement of the skirt or feed receiving well construction in the central vertical zone of the tank provides or leaves an outward quiescent zone around and below the outside of the skirt while a zone of circulation or agitation exists inside and below the skirt and extends, for example, in a blanket fashion outwardly towards the bottom of the tank.

As already indicated instead of employing an air lift device at the bottom of the central tube an equivalent circulation is secured by arranging a rotary impeller inside the tube in a suitable enlarged chamber.

According to a modification in which the tank is provided with a pedestal in the bottom of the tank and coaxial therewith, the arrangement of this pedestal provides an annular collecting channel. A central rake-arm carrying shaft or rake-arm carrying structure is pivotally mounted on the pedestal so as to have turning movement about a vertical axial line. In the arm-carrying structure of this modification there is at least one pair of parallel vertical tubes mounted therein or thereupon in spaced relationship such that the lower ends of these tubes revolve or move in and along the collecting channel around the pedestal. One of these tubes at its upper end carries radial distributing nozzles or launders, one of which nozzles or launders in the revolution of the tube around the axis of the rake shaft periodically delivers to the arcuate launder or feedwell trough described above, whilst the other of the nozzles or launders of that particular tube constantly discharges a proportion of the liquid and coarser particles rising upwardly within said tube for recirculation through the skirt. The other tube of the pair terminates below the level of the liquid and within the skirt. Both tubes are provided with air lift means or other impeller or circulating means so that there is a continuous stream or current of admixed liquid and solids (pulp) flowing up the tubes. The shorter of the tubes is utilized solely for recirculation purposes while the other distributes its contents partly to the arcuate launder and partly back into the tank.

According to yet another modification, instead of arranging the removal recirculating and distributing means within the tank the removal of coarser settled or settling particles takes place downwardly from the bottom of the tank through a suitable pipe-line and this material is raised by a suitable pump, impeller or air lift to be discharged partly back into the tank for recirculation and partly to the next tank of the series, preferably by aid of a rotary distributing device and arcuate launder as above described.

In operation, the agitation zone where the contact between the solution and the solids mainly takes place, is inside the skirt and extending below the skirt and out to the sides of the tank. Precipitated hydrate crystals eventually settle to the bottom of the tank where they are slowly moved or raked toward the center and are then elevated by the air lift as described. The coarser crystals will settle faster than the fines; thus coarser crystals or segregates constitute the prevailing percentage of the content of the air lift. Consequently as material in one tank has been sufficiently treated, it is removed from the tank and is progressed to the next tank in the series or to a classification step, the transfer being effected through the arcuate launder as referred to above. The substantially clear superjacent solution or supernatant obtained in the quiescent zone of the tank is removed by the peripheral overflow launder or other means and flows either separately or together with the coarser hydrate crystals into the skirt of the next tank, or where the last tank of the series is concerned the solution may flow separately to a storage tank or to a thickener for completion of the clarification.

Apparatus according to the invention hereof and which employs a series of novelly constructed tanks for performing and realizing the improved method of developing precipitating crystals from a pregnant solution and for subjecting a pulp thereof to repetitive treatment whereby the improved results and stabilized sought-for end products are attained is illustrated by way of example, in the accompanying drawings wherein—

Fig. 1 is a diagrammatic view or flow-sheet of a plant for performing and realizing the invention hereof.

Figs. 2 and 3 respectively provide a vertical sectional view and a plan view of a series of functionally connected tanks of novel construction and which tanks collectively provide a precipitation section into which the pregnant solution supplied for treatment is delivered into a feedwell or skirt of the initial tank at the head of the series and from which resulting pulp passes from the final tank at the tail end of the series. In connection with the tanks of Figs. 2 and 3, it will be noted that each is provided with a solids-lifting means employing a rising draft tube into which air is discharged at the lower end thereof to provide suction and lifting effect whereby solid particles—settled precipitates, as well as settling particles—are sucked into the tube, are raised and ultimately are delivered in a distributive manner from the draft tube, to wit, in a manner whereby a large portion thereof is delivered into the feedwell for repetitive treatment within the tank and whereby as the case may be, a lesser quantity is passed for delivery to a region outside of the tank, as for example, into a succeeding tank of the series, or in the instance of the last tank of the series, to a washing thickener preparatory to a dewatering or filtering operation.

Figure 5:
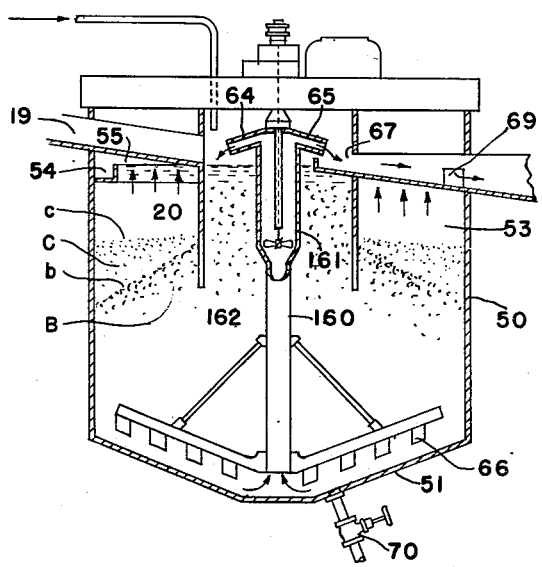
Fig. 5 is a vertical sectional view showing a tank apparatus of Fig. 2 somewhat modified in that a rising draft tube is enlarged at its upper end to receive a motivated impeller that is relied upon for sucking, lifting and for effectively delivering pumped or lifted solids from the upper end of the draft tube.

Figs. 6, 7 and 8 respectively provide a vertical cross-sectional view looking in one direction, a partial vertical cross-sectional view looking in another direction and a plan view of which certain parts are broken away of a modified form of tank apparatus adapted for use in the precipitation section.

Like reference characters designate like parts in the several views.

According to the diagram or flow-sheet of Fig. 1 the crude aluminate solution is obtained, for example, by bringing together burnt lime (CaO) ground bauxite and make-up soda ash ($Na_2CO_3$) or caustic soda (NaOH) and by subjecting the mixture thereof to pressure digestion carried out as at 10 and employing a heated spent liquor or solution passed thereto along line 46 from a heating zone 45. Such spent liquor is derived from a subsequent portion of the process, as from the effluent launder 43 of a mechanically raked settling tank 13, from which launder 43 the spent liquor is conducted along line 44 to the heating zone 45.

From the pressure digestion operation carried out at 10, there results an impure hot liquor or solution containing alumina hydrate in dissolved form or phase and also impurities in the form of solid particles settleable as red mud. Said impure solution, after being possibly diluted with diluting or weak liquor supplied through pipe 11, is passed along line 12 into a washing type multi-tray thickener 14 into which wash-water is supplied along a water supply line 15. According to the functioning of this thickener 14, a red mud slurry is derived that is passed as a sediment or underflow from the lower portion of the thickener and from the upper portion of the thickener there is passed as effluent outflow along line 16 a solution carrying alumina hydrate in dissolved form and some solid particles therein. This solution is thereafter subjected to a further clarifying operation as by filtration at 17 in order to remove any residual solid impurities. Thereafter, if deemed advisable the filtered solution from 17 is cooled as at 18 before it is delivered along line 19 into the feedwell 20 of the initial tank of a series of novelly constructed tanks 21, 22, 23 and 24 wherein there is carried out a novel series of steps.

Also into the initial or first of these tanks there is passed along the line 25 a slurry or pulp of fine settled crystals of alumina hydrate which is derived from a subsequent portion of the process, to wit, from the mechanically raked settling tank 13. The fine alumina hydrate slurry crystals serve and are employed as a seeding material that functions as nuclei and as an aid in the precipitation and crystal growth of precipitating alumina hydrate within the tanks 21, 22, 23 and 24.

That portion of the plant, to wit, the apparatus which includes the functionally and serially connected tanks 21, 22, 23 and 24 is herein referred to as the precipitation stage or station 26.

In the tanks of this station, there is a progressive reversion or decomposition of the sodium aluminate solution that yields sodium hydroxide in liquid phase and alumina hydrate in precipitating solid phase. The developing crystals of the latter constitute the sought-for and desired end product, to wit, in the form of developed grains. From the last or final tank of this series, mother liquor containing a quantity of these developed grains is passed along an outflow pipe or pulp discharge conduit 27 directly into a counter-current washing classifier station 28 made up, for example, of a series of functionally connected raking classifiers 29, 30 and 31.

According to the normal function of such classifier, there is a progressive movement by raking of the settled or segregated crystals as they move forwardly and upwardly along an inclined deck to emergence, counter to a backflow of washing liquid that ultimately passes from the classifier into an outflow launder 32 at the deep end of the classifier. This liquid with certain washed-out fine particles or crystals suspended therein is passed as by pump 33 and pump line 34 into the mechanically raked quiescent settling tank 13. Into this same settling tank 13, there is also passed outflowing supernatant liquid from launder 54 of the last or final tank 24 of precipitation station. The effluent received in and passing from the tank launder 54 also contains a certain amount of fine alumina hydrate crystals and the passing of the outflowing effluent from the launder 54 of the final tank 24 of the precipitation station 26 to the settling tank 13 is through the medium of a pump 36 and pump line 37.

The washed granular solids emerged or raked from the washing classifier station 28 are passed along therefrom through discharge line 38 to a rotary vacuum filter 39. The latter is provided with a wash-water applying means as 40 whereby to obtain as a further washed product, a filter cake of granular alumina hydrate $Al(OH)_3$ crystals which is the sought-for end product.

The filtrate from the filter 39 is or may be used as wash-water employable in the washing classifier station 28 and such filtrate is supplied to the solids emerging end of the washing classifier 31 as by filtrate pump 41 and filtrate line 42.

In the mechanically raked settling tank 13 solids deposit as sediment or pulp and provide the slurry containing fine alumina hydrate crystals or particles employable for seeding. Such slurry is introduced through the medium of seeding line 25 into the feed-receiving well 20 of the tank 21 at the head end of the precipitation station and as into any one or more of the feed-receiving wells of the succeeding end tanks 22, 23 and 24 of the precipitation station 26.

The effluent from this mechanically-raked settling tank 13 collects in a launder 43 and constitutes or provides the spent solution which is passed along line 44 and which is later subjected to a heating operation at 45 and made available when passed along the line 46 for employment as hot liquid used in the pressure digestion operation 10.

The invention of this case is primarily concerned with that which takes place in the precipitation station 26 and in the novel method carried out in said section and in the novel apparatus for carrying out that method.

The tanks of the precipitation station 26 follow a general pattern that may be embodied in diverse forms within the confines of the general pattern as is herein indicated. The functionally connected tanks 21, 22, 23 and 24 of this station are shown in vertical sectional elevation in Fig. 2 and by partial plan views in Fig. 3. Each of these tanks has a marginal wall 50 cylindrical in plan rising from a bottom 51 which preferably slopes downwardly and inwardly and thereby of a general inverted conical formation. Each tank has a circular feed-receiving skirt or feedwell 20 extending downwardly within the tank and concentrically disposed with respect to the marginal wall. Each tank is equipped with an effluent outflow means 52 for conducting supernatant liquid from within the surrounding or outlying space, specifically an annular space 53 (a space, which is between feedwell 20 and the marginal wall of the tank) to a region outside of the tank. The outflow means just referred to is provided by a marginal tank launder 54 having an overflow weir edge 55 that determines the normal operative liquid level 56 of the body of suspended solids undergoing treatment within the tank.

In connection with the foregoing, it will be noted that each feedwell or feed receiving skirt 20 extends or descends from an elevation higher to an elevation 57 lower than that of the overflow weir edge 55 to which the skirt or feedwell corresponds. In the initial tank 21 of the series, seeding material may be fed into the feedwell 20 as along pipe line 25 while clarified aluminate solution to be treated may be supplied as along the feed pipe or conduit 19 (see Figs. 1 and 2).

Each tank is equipped with a mechanically actuated sediment-raking or impelling means 58 and a lifting or pumping means designated 59, The raking means 58 of the lifting or pumping means 59, the latter of which may be collectively referred to as a combined raking or feeding and pumping means, is preferably embodied in a single structure which may therefore be viewed as provided by a composite construction.

An important aspect of the invention hereof revolves about providing each tank with combined raking and pumping means which is so functionally disposed with respect to the tank as to assure the building up and the maintaining of an ever-changing pulp, mass, or body of mobilized or suspended developed and developing alumina hydrate crystals, to wit, existing as an ever-changing pulp body B rising to a main breakline b which should be preferably maintained at an elevation whereby the ever-changing body B reaches outside of the feedwell and above its lowermost edge. Above this breakline b there is an overlying strata embodying intermediate size suspended crystals which may typically be referred to as a cloudy strata at C having a minor breakline at c that generally is maintained at elevation below that of the overflow weir edge 55. Within the region 53 above the minor breakline c, there is established a strata of that which may be viewed as relatively clarified supernatant provided by the liquid rising from the regions and strata below into the region above the minor breakline c and which clarified supernatant is normally maintained up to the normal liquid level 56 determined by the overflow weir edge 55 of the tank launder 54. The demarcations of ever-changing pulp or body of suspended solids of the intermediate cloudy strata, and of the overlying clarified supernatant strata are clearly indicated as in the tank 21 of Fig. 2, or the tank of Fig. 5.

In Fig. 2, the raking and impelling means 58 embodies a suitably mounted tubular shaft 60 turnable about a vertical axial line and serving as an arm-carrying structure. From the lower portion of this tubular shaft arm-carrying structure 60 there outwardly extend arms 61 having upwardly and inwardly bracing members 62 which with the arms function as sediment-engaging or raking members. These arms 61 are also preferably equipped with depending raking blades 66 which slant rearwardly and inwardly whereby as they operate over and along the tank bottom they function progressively to impel and to feed or supply settled solids inwardly toward and into the lower central section of the tank. These arms 61 are sometimes referred to as rake-carrying arms.

The tubular shaft 60 functions as a vertically-extending draft tube of an air lift or pumping means and it has associated therewith an air supply pipe 63. At the upper end of the tubular shaft or draft tube 60 there are provided outwardly-extending distributing arms or conduits 64 and 65 constituting members by which pulp sucked into the lower end of the draft tube and passed upwardly within and from the upper end of the draft tube is distributively delivered within the skirt or feedwell 20.

In this connection it is to be noted that the air supplied through the line 63 into the draft tube 60 supplies the energy whereby pulp is sucked into the lower end of the tubular shaft, passed upwardly within the tubular shaft and therefrom for distributive delivery by arms 64 and 65, into the feedwell 20.

Also, it will be noted that within the skirt or feedwell 20 of each tank of Figs. 2 and 3 (also see Fig. 4), there is a short open top annular trough 67 disposed for receiving a quantity of the pumped pulp passing from the distributing arms or members 64 and 65 at the upper end of the tubular shaft or draft tube 60. Also it will be noted that while a quantity of the pumped pulp is delivered into said annular trough 67 that a major quantity of this pulp is returned to within the feedwell—in regions beyond the trough whereby they drop directly into or gravitate upon the upper part of that portion of the ever-changing body of pulp which is within the skirt or feedwell 20 or in the region immediately below the same.

Figure 4:
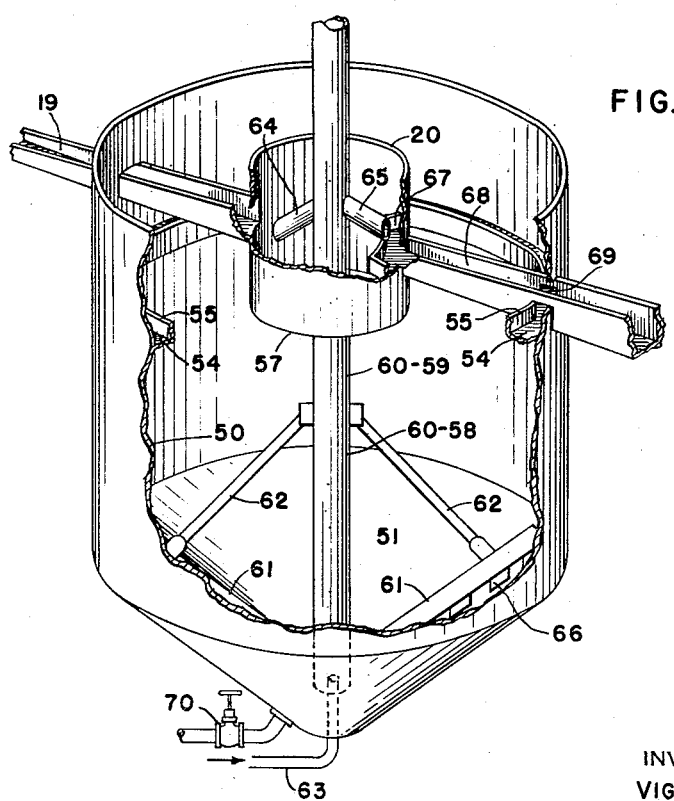
Fig. 4 is a perspective view partially broken away illustrating certain features of the construction of the tanks of Fig. 2.

In Figs. 2, 3 and 4, there is shown a discharge conduit or discharge trough section 68 leading from the short annular trough 67 to a region outside of the tank to which it corresponds as, for example, to and into the feedwell of the succeeding tank. In the construction shown, the discharge conduit 68 is located so as to extend whereby it and the effluent launder 54 of the corresponding tank are in liquid communication with each other at 69 whereby not only a quantity of the pumped pulp is delivered into the succeeding tank, but also whereby the outflow supernatant from the particular tank passes as overflow into the feedwell of the succeeding tank. This mode of flow from the several tanks applies to all but the last tank of the series from which it will be noted that a quantity of pumped pulp delivered into the short annular trough within the feedwell is passed to one locality outside the tank as, for example, by pipe line or conduit 27 to the receiving end of a washing classifier station 23, while the supernatant effluent from launder 54 is passed by pump 36 and pump line 37 (see Fig. 1) to another instrumentality as, for example, to a settling tank as 13 for re-use in the process.

The foregoing description of the tanks and associated parts applies to the tank of Fig. 5 except for the fact that in the tank arrangement of Fig. 5 a mechanical impeller is relied upon for imparting the requisite energy for the sucking in and the upwardly passing and delivering of the pumped pulp from the interior of the rising tubular shaft or draft tube 160. This draft tube is provided with an enlarged upper portion 161 and therein there is located a submergedly positioned impeller 162 that functions as a pump or lifting element that supplies the energy for effecting the sucking in pulp from the lower portion of the tank, the upward passing of such pulp within the draft tube and the distributive delivery thereof whereby some pass to a region outside of the tank while another portion or quantity of such pulp is delivered into the feedwell 20 for repetitive treatment within the tank.

Figs. 6, 7 and 8 disclose a form of tank construction in which the composite solids-raking, impelling and pumping mechanism includes an arm-carrying structure in the form of a suitably supported arm-carrier structure or cage 260 turnable about a vertical axis from and by which outwardly-extending arms 261 are carried through the medium of downwardly and outwardly-extending plates 262 and braces 263, and which are further braced by diagonals 264 and 265, also in connection with said arm carrier there are provided vertically spaced laterally-extending carrier members 266, 267 and 268. In this form of composite mechanism there are carried laterally spaced vertically-extending pump pipes or draft tubes 269 and 270 which are respectively supplied with an air lifting means as 271 and 272. Of these two lifting pipes or tubes 269 one is short and submergedly delivers pumped pulp within the interior of the feedwell 20, while the other 270 is longer and is equipped with pulp distributing members 273 and 274 disposed so that as the rake-arm carrier turns there is delivered as by distributing conduit or member 274 a quantity of the pumped pulp into the short annular trough 275 and therefrom to a region outside of the tank while another part of such pulp is delivered by the conduit or member 274 into the feedwell, also by conduit or member 273 a quantity of pumped or lifted pulp is delivered into the feedwell. Moreover, all of such pulp passed from the upper end of draft tube 269 is delivered into the feedwell 20 at elevation lower than that of the discharge end of either the discharge conduit 273 or 274 of draft tube 270. The tank of Figs. 6, 7 and 8 is equipped with supernatant outflow means having effluent launder 54 with overflow weir 55 that determines the normal liquid level of the tank.

With respect to the short arcuate launder or open top receiving trough section 67 within the feedwell it will be noted from the drawings that the upper edges of the receiving trough are necessarily at elevation higher than that of the elevation of the overflow weir element 55, also that said requirement applies with respect to the upper edge portions of the open top outflow trough section 68 leading from the receiving trough section 67 if and when such outflow trough construction is employed to provide the outflow section 68. However, in place of such open trough outflow section which serves as an outflow conduit leading from the tank, there can be employed a closed or tubular type of outflow conduit, to wit: as indicated by the pipe 27 leading from the receiving trough section 67 within the feedwell or skirt 57 of the last tank 24 of the series of tanks in Figs. 2 and 3. Where an open top outflow conduit or trough section is employed in an arrangement according to which the effluent leaving the effluent collecting launder 54 is to be delivered into the outflow trough or conduit 68, then and in that instance the effluent passes from the launder 54 through submerged passage area 69 leading into trough or conduit 68.

In connection with the solids lifting and pumping means designated as 59, the energy for effecting the lifting and pumping function is supplied by pressure air supplied by and delivered from the air line 63. It will be noted that the tubular shaft that provides the solids lift and delivery tube has outwardly extending pumped solids delivery and distributing arms as 64 and 65. These arms are so disposed that as the tubuar shaft is turned there is effected a split delivery of the lifted and pumped pulp whereby a quantity thereof is delivered into the open top receiving trough 67 from which the pulp received there is passed and delivered to a region outside of the tank—within which the pulp was raised—while another quantity of the pumped or raised pulp is delivered into the feedwell for repetitive treatment within said tank. It will therefore be recognized that the construction just described serves as a flow-splitting means provided for accomplishing said outlined desired result and end. This desired end— viz: the splitting of pumped pulp whereby a certain quantity is returned to and delivered into the feedwell for repetitive treatment within the tank from the lower portion of which the pulp passed, while another quantity of said pumped pulp is so delivered that it is discharged to a region outside of the tank without any repetitive treatment within the tank.

With respect to the precipitation tanks of Figs. 2 and 3 of Fig. 4, Fig. 5 or Figs. 6, 8 and 9, it will be noted that each of these tanks is preferably equipped with a valve-controlled discharge pipe 70 leading from the lower portion thereof whereby it is available for employment at any time when it may be found desirable or advisable to empty the tank.

In general the several precipitation tanks are shown as open top tanks but in certain instances one may prefer to have closure tops thereupon either fixedly secured thereto or as readily removable tops. A fixedly positioned closure top is indicated as a horizontal roof member on the tank of Fig. 6.

From the foregoing it will be seen that this invention contemplates the treatment of a clarified sodium aluminate solution under conditions to cause its decomposition back into its original or starting constituents, namely, sodium hydroxide in solution phase and aluminum hydroxide in precipitated or solid phase. The aluminate solution is treated in a series of precipitating tanks wherein the decomposition of the solution takes place and there is yielded the alumina hydrate in crystallizing condition. It crystallizes in a precipitating tank that holds a liquid-solids mixture of pulp that is characterized by including some of the solution undergoing decomposition, some of the crystallizing hydrate, and a mass of larger previously crystallized and enlarged crystals of hydrate segregated and returned to the tank from a point farther along in the process. A feature of importance is that the returned crystals are larger and well-developed because they are recycled from the bottom of the tank to which they have been well-developed enough to settle and segregate as sediment. A pulp of such sediment is raised and in discharging, it is split into controllable fractions, of which one fraction goes back into the tank from which it came while another fraction is progressed to further treatment in the process. The pulp returned to the same tank contains both crystals and mother liquor or solution so the rate at which it is returned can be arranged to control the density of the pulp in the tank to be maintained within optimum limits. Another feature of the invention is the mixing with the fraction that goes to further treatment of a quantity of the clarified effluent from that same tank.

Having now particularly described and ascertained the nature of my said invention and in what manner the same is to be performed, I declare that what I claim is:

1. An apparatus of the class described comprising a tank having a bottom with marginal wall rising therefrom and equipped with effluent collecting launder at the upper interior portion thereof and providing an overflow weir element determining the normal operative surface level of supernatant liquid within the tank and having outflow passage means leading to the exterior of the tank; a skirt extending from an elevation higher than that of said overflow weir element into the liquid holding portion of the tank and terminating at elevation from substantially lower than that of the overflow weir element and serving as an open bottom central feedwell section for receiving feed material supplied thereinto for treatment within the tank, which skirt is of less diameter than that of the interior of the tank and provides outside thereof and between it and the upper interior portion of the tank a surrounding supernatant liquid receiving section wherein the effluent collecting launder is located; within said skirt an open top trough of which the upper edges of said trough are higher than that of said overflow weirs and conducting means leading therefrom to a region outside of the tank; means for passing incoming feed material for treatment within the tank and for delivering said incoming material into a region within the skirt while avoiding passing of the incoming feed material into said open top trough; means for transferring liquid solids identified as pulp from the lower interior portion of the tank and for delivering a quantity of the transferred pulp into the skirt at a locality outside of the trough and also for delivering a quantity of the transferred pulp into said trough; and a conduit leading from said trough to a region outside of the tank.

2. An apparatus according to claim 1 in which the outflow passage means of the effluent collecting launder is in hydraulic communication with the conducting means leading from said open top trough and thus merges with the conducting means leading to the region outside of the tank.

VIGGO HARMS.

REFERENCES CITED

The following references are of record in the file of this patent:

UNITED STATES PATENTS

| Number | Name | Date |
|---|---|---|
| 1,076,666 | Dorr | Oct. 28, 1913 |
| 1,099,396 | Rothwell | June 9, 1914 |
| 2,013,438 | Fitz | Sept. 3, 1935 |
| 2,164,111 | Jeremiassen | June 27, 1939 |
| 2,347,073 | Beekhuis | Apr. 18, 1944 |